United States Patent
Franceschi et al.

(10) Patent No.: US 12,536,600 B2
(45) Date of Patent: Jan. 27, 2026

(54) CODE GENERATION AND TRACKING FOR AUTOMATIC DATA SYNCHRONIZATION IN A DATA MANAGEMENT SYSTEM

(71) Applicant: Brex Inc., Draper, UT (US)

(72) Inventors: Pedro Franceschi, San Francisco, CA (US); Ignacio Corderi, San Francisco, CA (US)

(73) Assignee: Brex, Inc., Drapher, UT (US)

( * ) Notice: Subject to any disclaimer, the term of this patent is extended or adjusted under 35 U.S.C. 154(b) by 65 days.

(21) Appl. No.: 18/404,235

(22) Filed: Jan. 4, 2024

(65) Prior Publication Data

US 2024/0233038 A1 Jul. 11, 2024

Related U.S. Application Data

(63) Continuation of application No. 17/892,957, filed on Aug. 22, 2022, now Pat. No. 11,900,476, which is a (Continued)

(51) Int. Cl.
*G06Q 20/04* (2012.01)
*G06F 18/22* (2023.01)
(Continued)

(52) U.S. Cl.
CPC ........... *G06Q 40/12* (2013.12); *G06Q 20/045* (2013.01); *G06Q 20/4097* (2013.01); *G06V 10/75* (2022.01); *G06V 30/413* (2022.01)

(58) Field of Classification Search
CPC .. G06Q 40/12; G06Q 20/045; G06Q 20/4097; G06Q 20/04; G06Q 20/389;
(Continued)

(56) References Cited

U.S. PATENT DOCUMENTS 9,063,978 B1 * 6/2015 Kapoor .................. G06F 21/64
10,115,083 B1   10/2018 Koeppel
(Continued)

FOREIGN PATENT DOCUMENTS

JP  2002245391  8/2002
JP  2012194985  10/2012
(Continued)

*Primary Examiner* — Clifford B Madamba
(74) *Attorney, Agent, or Firm* — Perkins Coie LLP

(57) ABSTRACT

There are provided systems and methods for code generation and tracking for automatic data synchronization in a data management system. A user associated with an entity, such as an employee of an organization, may purchase an item utilizing a payment instrument or card provided by the organization. In order to provide proper expense allocation, the organization may require receipt matching and storage per use of the payment instrument. An expense management system may provide digital code generation and output on a corresponding physical or digital receipt so that when the receipt is provided to the expense management system, the codes may be matched to backend data stored by the system. The receipts may be processed by extracting text data from an image of a receipt to determine the codes. The codes may then be used to search a database of codes to match to digital transaction data.

20 Claims, 6 Drawing Sheets

Related U.S. Application Data continuation of application No. 16/664,592, filed on Oct. 25, 2019, now Pat. No. 11,423,368.

(51) Int. Cl.
  *G06Q 20/08* (2012.01)
  *G06Q 20/40* (2012.01)
  *G06Q 40/12* (2023.01)
  *G06V 10/75* (2022.01)
  *G06V 30/413* (2022.01)

(58) Field of Classification Search
  CPC ...... G06Q 20/40; G06V 10/75; G06V 30/413; G06F 18/22
  USPC .......................................................... 705/44
  See application file for complete search history.

(56) References Cited

U.S. PATENT DOCUMENTS

| | | | |
|---|---|---|---|
| 10,157,425 B2 * | 12/2018 | Chelst | G06Q 40/125 |
| 10,229,314 B1 * | 3/2019 | Mitchell | G06Q 20/047 |
| 10,410,191 B2 | 9/2019 | Ceribello et al. | |
| 2008/0046347 A1 | 2/2008 | Smith et al. | |
| 2010/0038419 A1 | 2/2010 | Blake et al. | |
| 2012/0010930 A1 | 1/2012 | Langdon et al. | |
| 2012/0084135 A1 | 4/2012 | Nissan et al. | |
| 2012/0185368 A1 * | 7/2012 | Schloter | G06Q 40/00 705/30 |
| 2013/0117183 A1 | 5/2013 | Bozeman | |
| 2013/0129218 A1 * | 5/2013 | Barrett | G06V 30/224 705/30 |
| 2013/0230205 A1 | 9/2013 | Nuggehalli | |
| 2014/0074690 A1 | 3/2014 | Grossman et al. | |
| 2014/0074748 A1 | 3/2014 | Xie | |
| 2015/0003734 A1 | 1/2015 | Barrett et al. | |
| 2015/0066688 A1 | 3/2015 | Blackhurst et al. | |
| 2015/0332415 A1 | 11/2015 | Johansen et al. | |
| 2016/0005132 A1 | 1/2016 | Freeman | |
| 2018/0025340 A1 * | 1/2018 | Schlosser | G06Q 50/12 705/24 |
| 2018/0047113 A1 | 2/2018 | Chelst et al. | |
| 2018/0053259 A1 | 2/2018 | Brahma | |
| 2019/0347057 A1 | 11/2019 | Segarra, Jr. et al. | |
| 2020/0175512 A1 | 6/2020 | Michael | |
| 2021/0004880 A1 | 1/2021 | Benkreira et al. | |

FOREIGN PATENT DOCUMENTS

| | | |
|---|---|---|
| JP | 2016128962 | 7/2016 |
| JP | 2016194802 | 11/2016 |
| WO | WO 2018/012653 | 1/2018 |

* cited by examiner

CODE GENERATION AND TRACKING FOR AUTOMATIC DATA SYNCHRONIZATION IN A DATA MANAGEMENT SYSTEM

CROSS-REFERENCE TO RELATED APPLICATION

This application is a continuation of U.S. patent application Ser. No. 17/892,957, filed Aug. 22, 2022, which is a continuation of U.S. patent application Ser. No. 16/664,592, filed Oct. 25, 2019, now U.S. Pat. No. 11,423,368, issued Aug. 23, 2022, all of which are incorporated by reference herein in their entirety.

TECHNICAL FIELD

The present application generally relates to data tracking through a networked control system and more specifically to alphanumeric code generation and image processing for automatic allocation of receipt data to stored data in a transactional database.

BACKGROUND

Organizations, such as businesses and companies, require various types of data to be tracked, such as through the user of expense management software, hardware, and other infrastructure to manage expenses and control user transactions. This includes issues with establishing and issuing payment instruments, tracking expenses and other accounting requirements, enforcing expense policies, and collecting auditing information, including receipts and other transaction history data. However, present networked systems and available company infrastructure merely provide for a few specific gatekeepers who are manually required to review and approve payments, as well as collect auditing information and allocate expenses to particular categories, clients, and other classifications. These accounting teams or company officers are then required to personally review expenses, auditing data, and assign expenses to categorizations. This is taxing for small companies that may have limited employees and offices, and large companies, where expenses may come from a wide range of employees that are difficult to track and properly receive data. However, without receiving auditing data and expense allocation information, the company may be at risk of fraud or legal issues.

Present systems used to track and manage transactions within a company may require submission of reimbursement requests or use of company payment instruments. Reimbursement requests require a large amount of manpower and may present issues with employee abuse of the system and non-compliant expense categorization by employees. However, use of company payment instruments may place the company at risk of fraud if proper auditing and expense categorization procedures are not implemented. However, collecting this data, such as receipts, employee activities and work, and other information is difficult and requires active employee participation. Thus, these present systems fail to identify users and company attributes during transaction processing, allocate expenses to particular expense categories, and collect auditing data without the need for employee input, thereby presenting difficulties and potential lack of necessary accounting data.

Therefore, there is a need to address deficiencies with conventional systems used by companies to better allocate incoming data to particular data categorizations and classifiers for processing.

Figure 1:
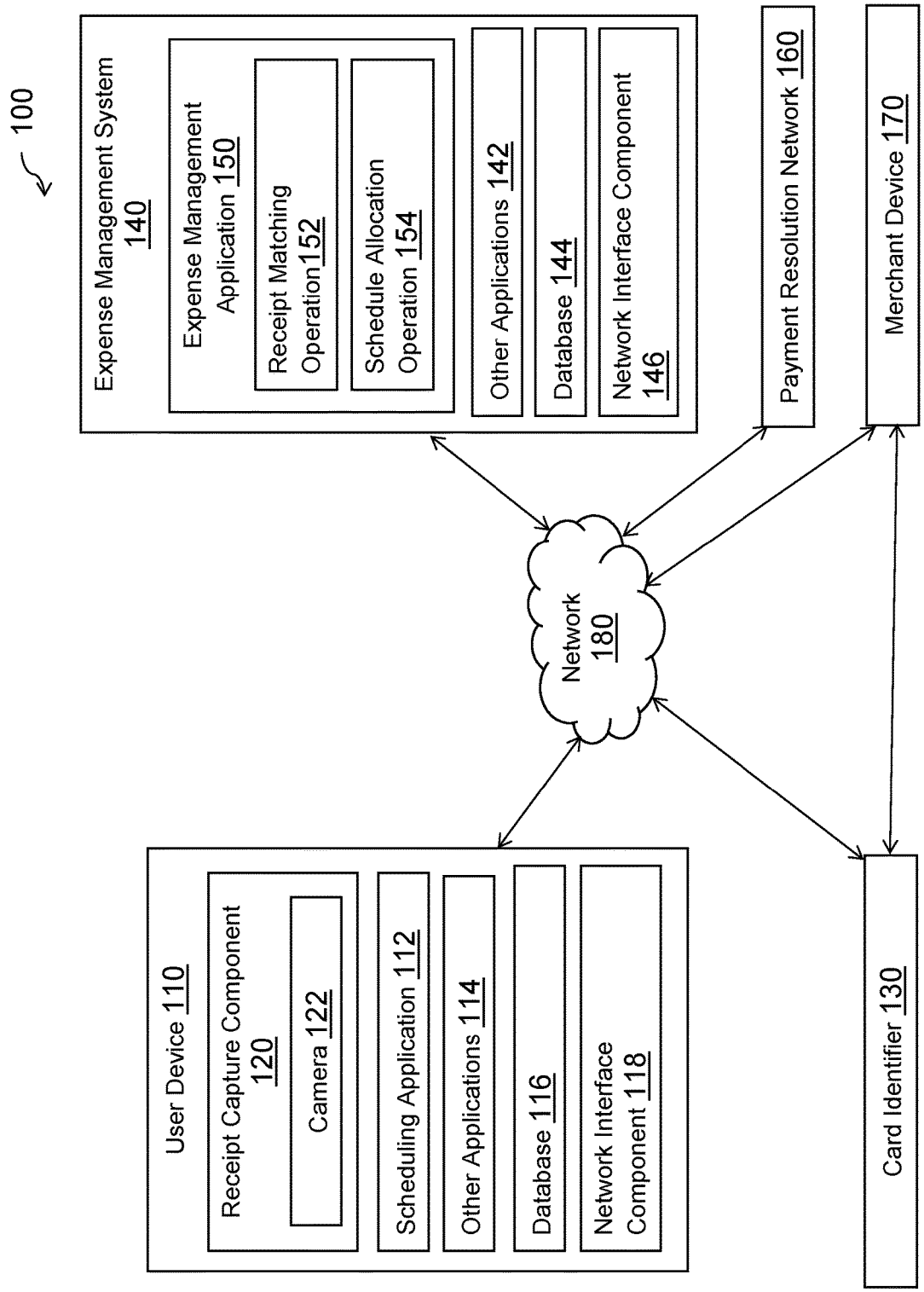
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods for code generation and tracking for automatic data synchronization in a data management system. Systems suitable for practicing methods of the present disclosure are also provided.

An online expense management system may provide data aggregators that monitor an organization's bank accounts and other financial accounts to perform data aggregation and categorizations for expense data. This expense data may be required for auditing and expense management services, such as receipt data tracking and assigning of expenses to organization, company, or employee clients, expense categories, and the like. The financial accounts may include one or more credit accounts, debit cards, direct debit/credit through automated clearing house (ACH), wire transfers, gift cards, and other types of funding sources that may be issued to the organization by the online expense management system and/or other financial service providers. Thus, a networked expense management system and provider may include a framework and architecture to provide payment gateways, billing platforms, eCommerce platforms, invoicing, and additional services. For example, a service provider may offer services, software, online resources and portals, and infrastructure used to manage an organization's (e.g., a business or company) expenses, purchases, and other financial transactions. The system may provide an electronic framework that integrates into a payment network and company computing infrastructure at a point that allows for automatic categorization and matching of data for auditing and expense management services. For example, integration of the framework at a point between issuing and acquiring bank may allow transaction data to be received in real-time, and thus the framework may perform real-time processes for data matching and categorization. This allows for real-time data processing necessary for receipt auditing. Additionally, the system's framework may integrate with one or more client devices (e.g., personal computers, mobile devices, etc.), online scheduling resources, personal management systems, and/or enterprise business software to receive scheduling, calendar, and/or other time allotment systems for use with expense data categorization.

For example, the expense management system may provide variable user settings, class designations, and expense policies, including expense categorizations to organizational expense categories (e.g., travel, business expenses (including payroll, office supplies and technology, etc.), client expenses (including travel, food, drink, gifting, meetings, etc.), information technology, and other expenses). A user class may correspond to one or more users within a group at the organization, such as sales, management, company officers, information technology, etc. There may also be sub-designations within a class, such as by title, team, role, location, or another attribute. The organization may further generate expense policies, which may include expense attributes such as global limits, approval limits, restricted/prohibited merchant or purchase types, time period specific limits, approved transaction types, and other limitations, permissions, or rules. The expense policies may correspond to a broader category of the aforementioned expense categories and may be organization wide or by user class. The expense policies may also include the aforementioned sub-categories of expenses, for example, by type of expense, clients, etc. Finally, the organization may be required to select payment networks utilized for issuance of payment instruments and transaction processing, which may include payment cards, direct debit, payment wires, or other types of funding sources. The payment networks may correspond to resolution networks for payment processing of expenses purchased using an account identifier, payment card, or the like during electronic and in-person transaction processing. Some embodiments of payment networks and expense management are discussed in further detail in U.S. patent application Ser. No. 16/238,498, filed Jan. 2, 2019, entitled, "Electronic Framework and Networked System for Variable Class Designations and Policies," and U.S. patent application Ser. No. 16/238,503, filed Jan. 2, 2019, entitled, "Intelligent Recommendations for Dynamic Policies Used in Real-Time Transactions," which are incorporated herein by reference One or more payment instruments may be issued to users or employees of the organization, including sales, management, information technologies, or other employees. The payment instruments may correspond to various types of payment cards and/or account identifiers, which may be issued by the expense management system or by an associated partner (e.g., an issuing bank that provides credit cards or another financial instrument). During the course of business, an employee may engage in commerce with one or more merchants using a payment instrument, such as by making an in-person (e.g., at a merchant location or store) or online purchase from the merchant. Thus, the user may request electronic transaction processing through the account number or payment instrument identifier(s) provided to the user. Merchants (e.g., a seller or payment receiver, such as a business, fundraiser, healthcare provider, landlord, etc.) may correspond to any person or entity selling goods and/or services (referred to herein as an "item" or "items") to the company's employees. Due to integration between an organization's enterprise resource planning (ERP) software and infrastructure, banks used by the organization, individual cardholders of the organization, and issuers (e.g., the financial source of the provided payment instruments on the payment network), the expense management system's framework may receive real-time data of the transaction, for example, prior to the transaction being approved and resolving through such entities. Thus, the expense management system may approve or decline the transaction in real-time based on expense policies and categorizations.

Additionally, the expense management system may generate, receive, and/or request auditing data in real-time with the transaction. The auditing data may include alphanumeric or other code generation and input the data into a receipt or other transaction history or record, as well as match receipt data to transactional or expense management data. Receipt matching may be performed through code matching between codes stored with transaction data determined at the time of a transaction processing request and subsequently received data from the organization and/or user requesting the transaction, such as an image of a physical receipt or a copy of an electronic receipt. This may allow the system to quickly receive data on the network, perform data matching, and store auditing data for expenses with merchants when payments are requested and processed.

To process a payment, the expense management system may receive transaction data for the payment request from the payment network, for example, when the acquirer (e.g., the acquiring bank for the merchant that processes the payment instrument provided by the user) requests processing with the issuer (e.g., the issuing bank of the organization and expense management system that issues the payment instrument). This occurs when the user causes a transaction to be generated, and the merchant generates a total for the transaction request, which the user can pay for by providing a payment instrument to the merchant. After receiving the payment instrument, the merchant may cause a payment request to be generated for payment of the transaction. In various embodiments, the user may be required to enter additional checkout information, such as a name, delivery location, or other personal or financial information that may be included in the transaction data for the transaction. In some embodiments, the payment instrument may previously be tokenized by the expense management system in order to further protect from fraud, where the digital token allows for backend identification of the payment instrument to the issuer and/or expense management system without exposing payment credentials.

The expense management system may receive or detect the transaction data for the electronic transaction. In response to the receiving or detection of the transaction data, the system may cause one or more codes to be generated, such as alphanumeric codes, barcodes, quick response (QR) codes, or the like. In some embodiments, the codes may correspond to a first authorization code of the transaction, for example, when the transaction is approved, and a transaction identifier code that uniquely identifies the transaction itself. The codes may correspond to a 6 digit or letter code, or may be shorter, longer, or different. In some embodiments, the length and/or type of code may be generated to prevent collision (e.g., code matching for two or more different transactions, especially transactions that are similar in transaction data) within the organization's expenses and/or with other organizations, which facilitates code matching later for auditing purposes. The codes may be stored with the transaction data detected and/or received by the system. These codes may then be transmitted to the merchant device or server processing the transaction data. Further, the system may cause the merchant device or server to output the codes with a transaction history or record for the transaction, such as a physical receipt or a digital receipt transmitted electronically to a device or account (e.g., the user's email, text messages, etc.). The codes may be placed in certain areas of the receipt, which may assist in image processing for identification of the of the codes on the receipt. For example, the authorization code and/or transaction identifier may be placed in line with a "total" line, a "signature" line, a transaction time line, a merchant identifier or address, or other line on the receipt so that the expense management system may more easily identify the code within the context of the receipt.

Once the receipt is provided to the user, the user may image the receipt and submit the receipt to the expense management system or may submit a digital receipt through another communication channel or data submission portal. In some embodiments, the expense management system may transmit an electronic message (e.g., email, Short Message Service (SMS) or Multimedia Messaging Service (MMS) text message, instant message, etc.) to the user's device that is associated with the payment card identifier for the transaction, which requests that the user image the receipt and send back the receipt or otherwise submit the digital receipt. However, in other embodiments, the user may do so after-the-fact, such as when providing expenses to the system, and the organization may not require immediate receipt imaging and submission. Thus, the expense management system may receive a digital form of the receipt, which may be processed to identify the one or more codes on the receipt.

Utilizing optical character recognition (OCR) and/or other data parsing and image processing, the system may determine and match the codes and data in the receipt to the transaction data received over the payment network. For example, where one or more codes are used, OCR or other image processing may be used to identify and locate the code(s) on the receipt. The OCR process may segment the receipt data to identify the code(s) in the data, which may be identified through character recognition and matching to stored codes by the system. In some embodiments, during segmentation of the data, lines may be traced at particular angles from receipt data to identify the code(s), such as parallel or perpendicular to an axis of the receipt. For example, where one or more codes are output on a line containing a "total" for the transaction, a line may be traced from an identified "total" line or amount to the right or left in order to identify code data on the receipt. Additional receipt data may also be extracted through OCR or other image processing, such as a merchant name/identifier, transaction time, total, or other receipt data. Once code data is identified on the receipt, the code data may be used to search a transactional database of the expense management system and identify matching transaction data. Matching receipt codes to transaction codes with the transaction data in the database may be used to store the receipt image or digital copy, and further extract additional receipt data for storage with the previously received/detected transaction data. This provides a more robust auditing, expense data collection, and management system.

A scoring system may also be implemented, in some embodiments, that scores the matching characteristics, codes, and/or transaction data between receipts, stored transaction data, and stored codes in order to perform receipt matching to transaction data, which provides auditing data based on receipt storage and additional transaction data parsing and entry. The scoring system may utilize the codes, times for the transaction data and on the receipt, and additional extracted transaction data to determine a most likely match based on a highest score or value between matching characteristics of the receipt and the stored transaction data with transaction codes. In some embodiments, one or more of the codes may be missing from the receipt, for example, where the merchant's hardware and/or software infrastructure does not permit adding of the one or more codes to the receipt. In such embodiments, any identified codes may further be processed with other data extracted from the receipt, such as a merchant identifier, address, items, total amount, tax, tip, user identifier, card number, and the like, to identify matching transaction characteristics, codes, and data in the expense management's transactional database. Once matching characteristics are found, each matching transaction may be scored, for example, by similar features between the stored transaction data, codes, and extracted receipt data to identify a most likely match. The most likely match may then be utilized for storing of the receipt with the previously obtained transaction data.

In some embodiments, a fingerprint database of merchant receipts may be generated and utilized to determine where code data may be printed or added to a physical or digital receipt. For example, during merchant integration and/or as merchants and organizations utilize the expense management system, merchant receipts may be received for the same or similar merchants, or merchants that utilize the same or similar point-of-sale devices, online marketplaces, or other processes to provide users with receipts. These receipts may be processed through a learning algorithm to identify similarities between receipts, as well as receipt formats. Additionally, code placement and usage on the same or similar receipts may be used to "fingerprint" merchants and identify their receipt type and format. Thus, when a merchant submits a receipt, the system may utilize the fingerprint of previous receipts to identify data placement on the receipt, which simplifies the OCR or other image processing operation. This allows for faster extraction of data from the merchant receipt.

The receipt data may also be used to extract transaction features used for categorization of the transaction with the expense policies of the organization. For example, the user submitting the receipt, the receipt items, the receipt time, the merchant, and/or the location may each be used to further categorize the transaction within the expense policies. Such categorization may be done automatically without user selection of the expense category or identification. Moreover, the expense management system may provide one or more application or platform integrations with a scheduling system to further obtain additional transaction data utilized for categorization of the transaction. For example, the expense management system may integrate with one or more mobile devices or personal computer scheduling, calendar, or other personal management applications that include a schedule of an organization's user appointments, meetings, travel, and other commitments. The expense management system may also integrate at a higher level than the particular application(s), such as an online platform that tracks user and/or organization scheduling and provides scheduling for a resident device application and/or web application. Such integrations may include those with Outlook®, Google Calendar®, and the like.

In this regard, when transaction data for a transaction is detected, received, and/or stored/processed by the expense management system, the expense management system may pull data from the application, platform, and/or database that corresponds to the transaction data for the transaction. In other embodiments, the data may be pushed to the system at the time of the transaction or periodically and/or otherwise accessed by the system. The system may utilize the scheduling and calendar data at the time of the transaction for the user submitting the transaction for processing and/or expense reporting to determine further transaction data and automatically categorize the transaction. The data may include a current activity or action of the user, a client name, phone numbers, emails, user/client identifiers, email addresses, one or more locations, activity/meeting subject matter or name, or other information necessary to define the user activity at the time of the transaction. The scheduling data may be matched based on times of the activities in the scheduling data and the transaction, as well as additional information. For example, a user location at the time of the transaction may further be determined using a GPS or other location detection component of a user device for the user generating and submitting the transaction, which may further be used to determine a schedule of the user. Other data integrations may be used to collect further data for categorizing the transaction, such as email/messaging data between users and/or clients, meeting room reservations with another scheduling component, travel plans with a travel reservation system, and the like.

The additional data for the transaction determined through the scheduling data may be stored with the previously obtained transaction data. Additionally, the expense management system may provide automatic categorization and sub-categorization of the transaction and expense into expense policies and sub-parameters within expense policies. For example, utilizing the meeting subject matter and client name, the transaction may be assigned to a client and added to an expense policy for the client associated with the user class that the user is in (e.g., sales expenses). Other scheduling information may be used to select sub-categories, such as "food" if the client was taken to a lunch or dinner, or "meeting preparation" or "travel" expense categorizations for a client and/or user class. The calendar information may be used to assign the transaction as an internal expense or an external expense that may be used by the organization to bill clients and/or users. For example, an expense during travel may normally be expensed to the organization, however, if the location or other scheduling and/or transaction data indicates it is not acceptable under an expense policy for the user, the expense may be charged to the user instead. The expense classification and categorization may be done automatically using the application, platform, and other data integrations, which does not require active user input to select expense categories.

In various embodiments, other types of card data, transaction data, messages/communications, or other contextual data may be used to assign an expense to a particular category, client, and/or system user. Additional contextual data may be any data associated with a transaction that may be detected and/or determined by an expense management system. For example, types of card data may include Level 2 (L2 or Level II) and/or Level 3 (L3 or Level III) card or transaction data that accompanies a credit or debit card transaction when the transaction is processed. L2 and/or L3 card data may include a purchase order number, a shipping address or zip code, a billing address or zip code, a destination location, a tax indicator and/or an amount, a consumer and/or merchant name, an item identifier (including an SKU, barcode, QR code, or the like), an item description or name, a price, a number or volume of the item, discounts or applied benefits, a merchant name and/or code, merchant information including an address or location, and similar data that may be used to further define the transaction and provide more detailed transaction information. For example, billing codes may be used to determine transaction information and assign that transaction to a category. Similarly, this card data may be used to determine where an employee is conducting a transaction, making a purchase, travelling, or otherwise performing a transaction on behalf of the company that should be expensed to a certain category. For example, a plane ticket purchase may include a destination city as part of the card data, which may inform the system of a client or other expense category for the purchased ticket. Similarly, multiple purchases having consumer/client/employee identity information may be used to assign each purchase to a particular category (e.g., two tickets purchased with a client/employee name on one ticket may designate both tickets to be expensed to that particular entity).

L2 or L3 card data may be provided and processed during a transaction to provide more detailed information for the transaction, lower card processing fees, and/or enable better authentication and security for fraud analysis and protection. The L2 or L3 data may therefore provide more granular transaction data that may be matched to expense categorizations, including clients, employees, and/or the purpose of the expense. Thus, the L2 or L3 card data may be used with data for an organization's expense management system to assign the transaction to a particular category. The L2 or L3 card data may be intercepted by the expense management system during transaction processing and/or approval of the transaction so that the transaction may be assigned to a specific expense category. For example, when a company credit card is used that is linked to or provided by the expense management system, the L2 or L2 card data may be acquired during transaction processing.

Communications may be accessed and analyzed (e.g., through keyword analysis or text extraction and processing) to identify any expense categorizations and assign an expense to a category. For example, a member or employee of an organization may send a message that states an intent for an expense (e.g., "Would you like to attend lunch during our conference?" that is sent to a client). The messages may also be exchanged between members when a transaction is processed using the company credit card or account. Exchange of these messages (including when within the same geo-fenced area or within a proximity distance) may indicate a categorization of an expense, such as for a conference or within a certain employee class or group. An employee or member of an organization may also message another member or a client of the organization at an event, which may be used to determine that expenses at the event are to be assigned to a particular categorization, such as a particular expense account associated with the client. For example, shared messages at an event between a client and an employee may indicate that transactions at the event using the company card/account are to be expensed to the client or on behalf of the client (e.g., an email exchange referencing the event and including a purpose of the expense).

In some embodiments, other applications on a mobile device associated with a user processing a transaction may be queried for data or data may be pulled from those applications. These other applications may include location detection and/or mapping, voice communication (e.g., telecommunication or VOIP), text or instant messaging, social networking, microblogging, media sharing, ticketing, travel, food, and other mobile applications. Data from the applications may be used to infer an expense for a transaction based on similar past data or may be used to further determine transaction data (e.g., a transaction location, messages between employee and client, etc.). For example, a ticket purchase to an airport associated with or located near a client and/or with a person associated with a client may be used to categorize the purchase as a travel to the particular client. Other examples include a reservation made at a favorite restaurant of a client, a reservation made nearby a client, a ticket purchase for an event (such as a sporting event, show, or concert) that can be associated with a client (such as previous interest from the client or prior similar purchase), a reservation made for lodging near a client, and/or a gift purchase that is known to be of interest to a client, e.g., associated with a hobby or cause. Using the application data, the expense management system may be able to determine more granular data for the transaction for automatic expense management and allocation for transactions. Note that the data does not need to be from an application on a user device but can be obtained through scraping public sites for content, such as a chat board where a user/employee mentions an upcoming trip to a client, such as on a travel forum.

Past data may also be utilized with current contextual data to assign an expense to a category. For example, if two or more members of an organization have previously bought plane or event tickets together and again buy the same or similar tickets, a previous expense category may be determined for the previous purchase, and the current expense may be assigned to the same or similar category. Additionally, travel or event tickets for the same members (e.g., within the same department) of an organization may be used to infer an expense categorization based on expense data entered by one of the users or a previous expense categorization for a similar expense. Similarly, if an employee purchases tickets or attends an event with a client (including purchase of tickets or payment of an expense at the event for the client), expense categorizations used for the event and/or client for previous expenses may similarly be used for the present expense.

As such, systems and methods are provided to enable a company to better manage electronic transaction data, including reimbursement or pre-approval requests, from its employees and contractors in real-time to reduce fraud and computing resources typically required with conventional systems. Further the system provides real-time data aggregation used for auditing purposes so that organizations may better collect and monitor data. Additionally, the present expense management system may utilize application integrations to assign transaction data to particular categorizations without requiring input from users and in real-time.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user device 110, a card identifier 130, an expense management system 140, a payment resolution network 160, and a merchant device 170 in communication over a network 180. A user (not shown) may correspond to an employee, contractor, shareholder, or other suitable person of a company (not shown and generally referred to herein as an "employee") associated with user device 110, which may utilize card identifier 130 to submit purchase requests for items to be paid using company funds. Card identifier 130 may correspond to a payment instrument allowing for purchase of items using company funds, which may be provided and managed by expense management system 140. Expense management system 140 may process payments using payment resolution network 160. Further, expense management system 140 may receive receipt and scheduling data from user device 110 for use in audit data collecting and expense categorization.

User device 110, expense management system 140, payment resolution network 160, and merchant device 170 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 180.

User device 110 may be utilized by an employee of an organization or company that employs one or more users, for example, to provide receipt and scheduling data to expense management system 140. For example, in one embodiment, user device 110 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data. In this regard, user device 110 includes one or more processing applications which may be configured to interact with expense management system 140 to manage payment instruments provided by expense management system 140 and further provide data utilized by expense management system 140. Although only one communication device is shown, a plurality of communication devices may function similarly.

User device 110 of FIG. 1 contains a receipt capture component 120, a scheduling application 112, other applications 114, a database 116, and a network interface component 118. Receipt capture component 120, scheduling application 112, and other applications 114 may correspond to executable processes, procedures, and/or applications with associated hardware. In other embodiments, user device 110 may include additional or different modules having specialized hardware and/or software as required.

Receipt capture component 120 may be implemented as specialized hardware and/or software utilized by user device 110 to capture a receipt of a user and transmit the receipt to expense management system 140 for processing. For example, receipt capture component 120 may correspond to a software application with a corresponding camera 122 that allows user device 110 to capture images of physical or digital receipts, which may include camera functionalities such as still/video image capture, zoom, image adjustment, and other image rendering processes. In other embodiments, a digital receipt may be received by user device 110, such as through a text message, email, or other communication channel. In response to receiving or capturing a digital copy of the receipt, receipt capture component 120 may transmit the receipt to expense management system 140. The receipt may then be processed based on one or more codes entered on the receipt by expense management system 140, as discussed herein. In various embodiments, receipt capture component 120 may include a general browser application configured to retrieve, present, and communicate information over the Internet (e.g., utilize resources on the World Wide Web) or a private network. For example, receipt capture component 120 may provide a web browser, which may send and receive information over network 180, including retrieving website information, presenting the website information to the user, and/or communicating information to the website, including payment information. However, in other embodiments, receipt capture component 120 may include a dedicated application of expense management system 140 or other entity, which may be configured to assist in establishing and maintaining user classes, expense policies, and payment networks.

Scheduling application 112 may be implemented as specialized hardware and/or software utilized by user device 110 to scheduling information to expense management system 140 for use in assigning expenses to particular categorizations. In this regard, scheduling application 112 may correspond to personal management software, hardware, and data utilized by a user associated with user device 110 to enter, store, and process data associated with a schedule, calendar, or other personal management information. Scheduling application 112 may include appointments, travel, meetings, reservations, and other types of calendar information for a user. Scheduling application 112 may be integrated with expense management system 140 so that data may be shared with expense management system 140 for transactions, for example, by providing scheduling data of the user at the time of a transaction. In some embodiments, scheduling application 112 may store and process scheduling data store directly to user device 110. However, in other embodiments, scheduling application 112 may access an online platform and database that provides the scheduling operations and data.

In various embodiments, user device 110 includes other applications 114 as may be desired in particular embodiments to provide features to user device 110. For example, other applications 114 may include security applications for implementing device-side security features, programmatic client applications for interfacing with appropriate application programming interfaces (APIs) over network 180, or other types of applications and processes. Other applications 114 may contain software programs, executable by a processor, including a graphical user interface (GUI), configured to provide interfaces to a user when accessing one or more processes or receiving and displaying data associated with user device 110 and/or expense management system 140.

User device 110 may further include database 116 stored in a transitory and/or non-transitory memory of user device 110, which may store various applications and data and be utilized during execution of various modules of user device 110. Thus, database 116 may include, for example, identifiers such as operating system registry entries, cookies associated with receipt capture component 120, scheduling application 112 and/or other applications 114, identifiers associated with hardware of user device 110, or other appropriate identifiers, such as identifiers used for payment/user/device authentication or identification. Database 116 may include data received from expense management system 140, such as payment request data, cardholder statements, approval requests, and the like, as well as data transmitted to expense management system 140 (e.g., data from receipt capture component 120 and/or scheduling application 112).

User device 110 includes at least one network interface component 118 adapted to communicate with expense management system 140, payment resolution network 160, and/or merchant device 170. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices.

Expense management system 140 may be maintained, for example, by an online service provider, which may provide payment instruments and expense management services to companies and other organizations. In this regard, expense management system 140 includes one or more processing applications which may be configured to interact with user device 110, payment resolution network 160, and merchant device 170 to facilitate processing of payments and enforcement of expense policies for payment instruments, such as ones associated with card identifier 130. In one example, expense management system 140 may be provided by BREX®, Inc. of San Francisco, CA, USA. However, in other embodiments, expense management system 140 may be maintained by or include other types of credit providers, financial services providers, and/or other service provider, which may provide expense management services to companies.

Expense management system 140 of FIG. 1 includes an expense management application 150, other applications 142, a database 144, and a network interface component 146. Expense management application 150 and other applications 142 may correspond to executable processes, procedures, and/or applications with associated hardware. In other embodiments, expense management system 140 may include additional or different modules having specialized hardware and/or software as required.

Expense management application 150 may correspond to specialized hardware and/or software to allow companies to receive payment instruments associated with a bank account and funding of the company, such as one or more company credit cards, and provide expense management for those issued payment instruments and additional funds/accounts of the company. In this regard, a company may first establish an account with expense management system by providing company data and onboard through expense management application 150. Such information may include bank account and funding information, such as verified funding from investors, available funds directly in an account, and burn rate of company funds over a time period. If qualified, expense management system 140 and/or another issuing entity may provide a payment instrument that is managed by expense management application 150. For example, expense management system 140 may issue card identifier 130 for a real or virtual credit card or may issue other types of payment instruments and instrument identifiers that may be used for company payments.

Expense management application 150 may provide one or more processes accessible by an administrator of an organization to establish settings and preferences necessary for the enforcement of expense policies and approvals/denials of payment requests using an issued payment instrument, such as card identifier 130. In this regard, the administrator may establish user classes and select expense policies, which correspond to attributes for allowable spend under that policy, such as maximum purchase amount, maximum spend over a time period, merchant/item types, location, hours of purchase, etc. Expense management application 150 may further provide additional processes for use with an expense management policy for an organization, such as receipt matching operation 152 and schedule allocation operation 154. The additional functionality and processes provided by expense management application 150 are described in more detail with regard to the additional Figures of the application, such as FIGS. 2A, 2B, 3, 4, and 5.

Receipt matching operation 152 may correspond to a process whereby codes may be generated for output on a receipt for a transaction, which may later be used for receipt matching. Receipt matching operation 152 may detect a transaction occurring using card identifier 130 with merchant device 170, for example, by expense management application 150 receiving transaction data for processing based on an organization's expense policy. The code(s) may include an authorization code based on authorizing the transaction for processing and a transaction identifier that identifies the transaction. Receipt matching operation 152 may cause the code(s) to be output or displayed on a receipt, for example, by communicating the code(s) to merchant device 170 for printing on a receipt and/or entry on a digital receipt. Thereafter, a digital copy of the receipt may be received by expense management system 140 and receipt matching operation 152 may be used to determine the codes on the receipt. The codes may be identified through OCR or other image processing, text processing of text data on a digital receipt, or other process. Once the codes are identified, the codes may be used to match the digital copy of the receipt to the stored transaction data from transaction processing. Receipt matching operation 152 may further provide a process to score the matches between codes, transaction data, and additional data extracted from a digital copy of a receipt, which may occur when one or more codes are not identified on the received receipt data.

Schedule allocation operation 154 may further provide a process for expense management application 150 to automatically categorize an expense based on data for a user at a time of the transaction. Schedule allocation operation 154 may provide an application data integration with scheduling application 112 or other scheduling platform so that schedule allocation operation 154 may receive schedule data for a time that a transaction occurs that is associated with the user and schedule. In other embodiments, schedule allocation operation 154 may integrate with a different application, process, or device to detect additional contextual data. The contextual data may include card data, such as L2 or L3 card data detected during a transaction based on input by the merchant or other transaction data. The additional contextual data may include communications between parties, such as employees and/or clients of an organization. In some embodiments, applications on a mobile device or content from public sites may be used to further determine transaction data used for expense categorization. Moreover, the current transaction data may be matched to past transaction data and categorizations so that expense allocation may be performed without requiring a user to again select or enter expense categorization selections.

Schedule allocation operation 154 may retrieve the schedule and/or contextual information for the transaction and may process the information to categorize the transaction into an expense type or category. For example, a location, client name, user identifier, or other information may be used to determine a type of expense, a client associated with the expense, or other information about the expense. Communications between parties may be used to determine an expense based on the content of the messages or the identities of the parties exchanging the messages. Moreover, other types of card data, application data, and/or other contextual data may further be used to assign the expense to a particular category. Schedule allocation operation 154 may further be used to assign the transaction to an expense policy of the organization for the user, such as an amount allowed under the policy and whether the transaction is authorized under that expense policy.

In various embodiments, expense management system 140 includes other applications 142 as may be desired in particular embodiments to provide features to expense management system 140. For example, other applications 142 may include security applications for implementing server-side security features, programmatic client applications for interfacing with appropriate application programming interfaces (APIs) over network 180, or other types of applications. Other applications 142 may contain software programs, executable by a processor, including a graphical user interface (GUI), configured to provide an interface to the user when accessing expense management system 140.

Additionally, expense management system 140 includes database 144. As previously discussed, the user, entity, and/or organization corresponding to user device 110 may establish one or more accounts with expense management system 140, which may be used to issue card identifier 130. Payment accounts in database 144 may include entity information, such as name, address, payment/funding information, additional user financial information, and/or other desired user data. The entity may establish expense controls and policies for their company that may be stored in database 144. Database 144 may also be used to store transaction data and information on issued payment instruments to the company and transactions processed using those instruments, including receipts matched to transactions and categorization or transactions based on scheduling information.

In various embodiments, expense management system 140 includes at least one network interface component 146 adapted to communicate user device 110, payment resolution network 160, and/or merchant device 170 over network 180. In various embodiments, network interface component 146 may comprise a DSL (e.g., Digital Subscriber Line) modem, a PSTN (Public Switched Telephone Network) modem, an Ethernet device, a broadband device, a satellite device and/or various other types of wired and/or wireless network communication devices.

Payment resolution network 160 may correspond to a network utilized for resolution of payment requests and electronic transaction processing, which may be governed by permissions (e.g., acceptances and denials) of payment requests for transaction processing by expense management system 140. In this regard, payment resolution network 160 may correspond to a credit card or debit card network where an acquiring bank or entity may interact with an issuing bank or entity for the resolution of a payment using card identifier 130. However, in other embodiments, payment resolution network may correspond to other types of payment networks and payment types, such as direct debit payments (ACH payments), wire exchanges or payments, prepaid card payments, or regionally/company-specific payments. Payment resolution network 160 may be implemented by expense management system 140 on request by user device 110, and may allow authorized users (e.g., users and user classes) to interact with the network to submit payments and process transactions, allow third parties (e.g., banks or other financial service intermediaries) to interact on the network on behalf of the user, and/or access or use data provided to or from the payment network, such as notifications of transactions and details that allow authorizing or declining transactions. Thus, expense management system 140 may utilize payment resolution network 160 in the managing, approval, denial, and data gathering associated with payment requests using company issued payment instruments associated with payment resolution network 160, such as card identifier 130, which may include transaction data that is audited and added to expense categorizations by expense management system 140. In some embodiments, payment resolution network 160 may include or be connected with an online banking resource for a bank utilized by expense management system 140 to resolve fees and payments processed by expense management system.

Merchant device 170 may be maintained, for example, by a merchant or other entity selling one or more items to users, which may include single users or groups of independent users as well as small and large merchants. Merchant device 170 may provide the items for sale, such as through use of various software, infrastructure, websites, applications, and/or other platforms for advertisement, sale, and payment processing. In this regard, merchant device 170 may include a device having processing applications, which may be configured to interact with user device 110, expense management system 140, and/or payment resolution network 160 to engage in transactions using card identifier 130. In some embodiments, merchant device 170 may be implemented as a single or networked personal computers (PCs), a smart phone, laptop computer, wearable computing device, and/or other types of computing devices. Although only one merchant device is shown, a plurality of merchant devices may function similarly.

Merchant device 170 may be implemented with an application offering items for sale that may be accessed by a computing device to present the items for sale to the user associated with card identifier. In certain embodiments, the application may provide a website available over the Internet and/or online content and/or database information accessible through a dedicated application. Thus, the application may provide item sales through an online marketplace using the website of the merchant. The application may also correspond to a checkout application at a physical merchant location, such as the application(s) of a point-of-sale (POS) device used to provide sales at physical locations. Merchant device 170 may be used to establish a transaction once a user/employee associated with user device 110 has selected one or more items for purchase. Once a payment amount is determined for the item(s) to be purchased by the user, merchant device 170 may request payment using card identifier 130. After input, merchant device 170 may then process a payment to the merchant associated with merchant device 170 using card identifier 130 and payment resolution network 160. Expense management system 140 may utilize network integration with payment resolution network 160 to manage expense policies for the organization associated with card identifier 130. Thus, expense management system 140 may approve or deny the payment request based on the policies for the company associated with user device 110. The transaction data may also be provided to expense management system for automatic expense categorization using a calendar of a user. The payment request may then be processed, payment provided to the merchant account, and notification of payment (or failure, for example, where the payment request is non-compliant with the company policies) may be sent to merchant device 170. Merchant device 170 may then receive the results of the transaction processing and may generate a receipt having one or more codes entered to the receipt for expense tracking and auditing purposes.

Network 180 may be implemented as a single network or a combination of multiple networks. For example, in various embodiments, network 180 may include the Internet or one or more intranets, landline networks, wireless networks, and/or other appropriate types of networks. Thus, network 180 may correspond to small scale communication networks, such as a private or local area network, or a larger scale network, such as a wide area network or the Internet, accessible by the various components of system 100.

Figures 2A, 2B:
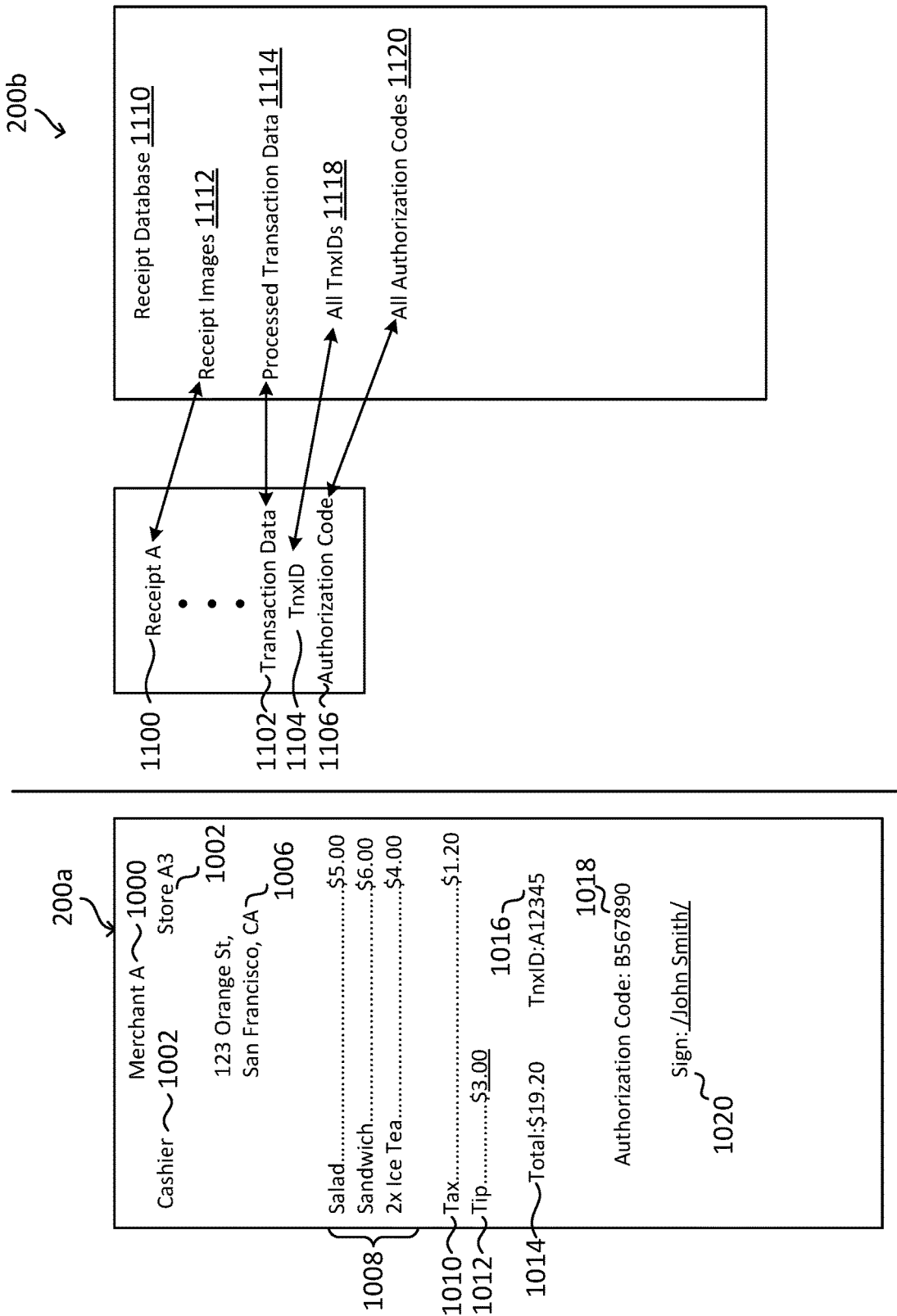
FIG. 2A is an exemplary receipt including an authorization code and transaction identifier used for receipt capture and data tracking with an expense management system, according to an embodiment.
FIG. 2B is an exemplary system environment for matching receipt data to expense data in a transactional database, according to an embodiment.

FIG. 2A is an exemplary receipt including an authorization code and transaction identifier used for receipt capture and data tracking with an expense management system, according to an embodiment. FIG. 2A includes a receipt 200a that include data used for receipt and transaction data tracking by an expense management system.

In this regard, receipt 200a includes one or more codes that may be used for receipt matching by an expense management system and policies for an organization. Receipt 200a includes transaction data as well, which may be used for receipt matching and/or extraction of further transaction data. For example, receipt 200a includes a merchant identifier 1000 for a Merchant A that generated the transaction based on a transaction request by a user. Receipt 2000a further includes a cashier identifier 1002, a store identifier 1004, and a merchant address 1006 that may be included on receipt 200a for additional information for the transaction and merchant that generated the transaction. Further, transaction data may be added to receipt 200a, which includes purchased items 1008, tax 1010, tip 1012, a total 1014, and a signature line 1020. In order to provide receipt tracking, a transaction identifier 1016 and an authorization code 1018 may be added to receipt 200a.

When an image or other digital copy of receipt 200a is provided to an expense management system, the system may utilize image processing to identify transaction identifier 1016 and authorization code 1018. Transaction identifier 1016 and authorization code 1018 may be identified through OCR or other image processing process and may be identified based on a fingerprint of receipt 200a and/or receipt fingerprints for merchant identifier 1000. Transaction identifier 1016 and authorization code 1018 may also or instead be identified through utilization of lines on receipt 200a for particular data and segmentation of receipt 200a by those lines. For example, transaction identifier 1016 may be known to be on a line with total 1014 so that the code "A12345" may be read as transaction identifier 1016 when the code is on the same line as total 1014. The fingerprint associated with receipt 200a and/or merchant identifier 1000 may also be used to extract code "B67890" as authorization code 1018.

Once the codes are extracted for transaction identifier 1016 and authorization code 1018, the codes may be matched to stored transaction data for the transaction associated with receipt 200a. Once matched, receipt 200a may be stored with the transaction data. However, if the transaction data cannot be matched and/or the codes are not extracted and determined from receipt 200a, additional receipt data may be extracted from receipt 200a, such as the merchant identifier 1000, total 1014, and/or other data on receipt 200*a*. A scoring process may be used to determine a most likely transaction for receipt 200*a* in the expense management system's database. The scoring system may look at similar transactions generated for the card identifier if receipt 200*a* shows a card identifier or is received from a user associated with a particular card identifier. Thus, other data from receipt 200*a* may also be used to associate the receipt to transaction data and store the receipt for auditing or other management purposes.

FIG. 2B is an exemplary system environment for matching receipt data to expense data in a transactional database, according to an embodiment. Environment 200*b* includes a receipt 1100 matched to data in a receipt database 1110, such as a transactional database of an expense management system. Receipt database 1110 may include data generated from transaction processing that is used to match the data to a digital copy of a receipt for receipt tracking and auditing purposes.

For example, receipt 1100 includes at least transaction data 1102, a transaction identifier 1104, and an authorization code 1106. Transaction data 1102 may be generated by a merchant device when a transaction is requested to be processed, which may include providing a card identifier associated with an expense management system that performs receipt matching. Transaction data 1102 may include merchant identifiers, items and costs, total, and other information. When receipt 1100 is generated, transaction identifier 1104 may be added to the receipt with authorization code 1106 by the expense management system so that receipt 1100 may be matched to transaction data in receipt database 1110. Receipt database 1110 includes receipt images 1112, processed transaction data 1114, transaction identifiers 1118, and authorization codes 1120. Receipt images 1112 may include digital copies of receipts, such as receipt 1100. Thus, a user may image receipt 1100 and provide the image to the expense management system, which may store the receipt and associated the receipt with a particular transaction in processed transaction data 1114.

Transaction identifier 1104 and authorization code 1106 may be extracted from the digital copy of receipt 1100 using OCR or other image processing, including based on a merchant or receipt fingerprint for receipt 1100. Once extracted, the expense management system may perform data matching using transaction identifiers 1118 and authorization codes 1120 for processed transaction data 1114 previously generated based on electronic transaction processing for a transaction requested by a user using a card identifier serviced by the expense management system. Once matched, the digital copy of receipt 1100 may be stored with the particular transaction from processed transaction data 1114. Moreover, transaction data 1102 may be extracted from receipt 1100 and added to processed transaction data 1114. For example, merchant information, tax, tip, or other data may be added to the transaction data for receipt 1100. This may allow for further auditing and expense management or categorization by the expense management system. In another embodiment, receipt 1100, either before or after capture, may allow a user to enter data, such as a code or a note that can provide additional information for management or categorization of the amount. The receipt may have a specific location, such as upper right corner, where the data can be entered, which enables more efficient capture of the data by eliminating the need for the system to scan the entire receipt. The specific location may vary between different types or formats of receipt, such as based on where there is the most unused space. Data may identify a purpose for the expense, names of individuals and associated company(s), and any other data that may be requested or helpful to the particular expense management system.

Figure 3:
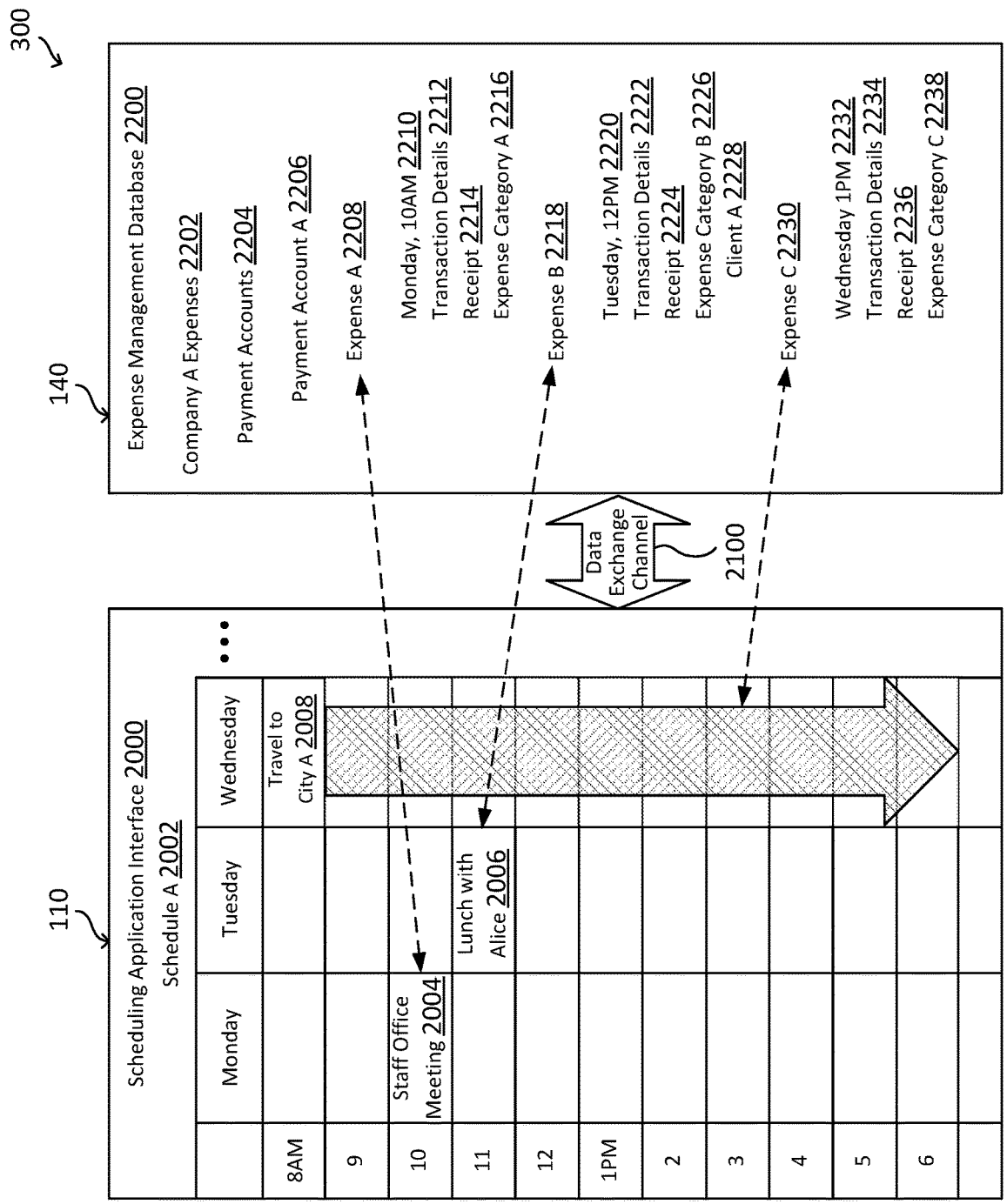
FIG. 3 is an exemplary system environment for synchronizing application scheduling data with expense data in a transactional database, according to an embodiment.

FIG. 3 is an exemplary system environment for synchronizing application scheduling data with expense data in a transactional database, according to an embodiment. System environment 300 of FIG. 3 includes user device 110 and expense management system 140 discussed in reference to systems 100 of FIG. 1. In this regard, an integration between user device 110 and expense management system 140 may be used to exchange data over a data exchange channel 2100 so that calendar or schedule information may be added to transaction data and used to classify or categorize the data in an expense management system and according to expense policies.

In system environment 300, user device 110 includes a scheduling application interface 2000 that includes a schedule A 2002 for a user, such as a calendar having appointments, meetings, travel, and other obligations or time allotments of the user. Schedule A 2002 includes calendar or scheduling information for weekdays, such as a shown Monday, Tuesday, Wednesday calendar. As shown in schedule A 2002, the user has a staff office meeting 2004 at 10 AM on Monday, a lunch appointment 2006 with Alice on Tuesday at 12 PM, and travel 2008 to city A on Wednesday from 9 AM to 6 PM. Each of these appointments may include a time, a location, clients or other users (e.g., company employees, associates, or other acquaintances including friends or family), a topic or type of the appointment, or other information about the particular appointment of the user. Calendar information for schedule A 2002 may be transmitted to expense management system 140 through data exchange channel 2100. For example, schedule A 2002 may be requested by expense management system 140 based on received transaction data, which may request all of schedule A 2002 or may request just particular portions of schedule A 2002 that match a time or other transaction data for a transaction. In other embodiments, schedule A 2002 may be pushed to expense management system 140 based on a processed transaction or otherwise transmitted to expense management system 140.

Expense management system 140 includes an expense management database 2200 that may be stored on one or more data structures of expense management system 140 (e.g., database 144 in system 100). Expense management database 2200 may correspond to a transactional database for transaction data generated from a processed transaction of an organization (e.g., using a payment instrument, account, or card identifier issued to the organization). Expense management database 2200 may store the transaction data, and expense management system 140 may require or provide expense categorization and assignment to expense policies for expensing business costs, accounting, and auditing purposes. Thus, expense management database 2200 includes company A expenses 2202 for the transaction data and corresponding expenses of company A that purchases items and services. For example, company A expenses 2202 may be organized by one or more payment accounts 2204 including a payment account A 2206. Payment account A 2206 may correspond to a card or account identifier for a payment instrument provided to the user associated with user device 110 and therefore schedule A 2002. Thus, expense management system 140 may categorize the expenses of the user using the transaction data of company A expenses 2202 for payment account A 2206 and data from schedule A 2002.

For example, an expense A 2208 may include a time 2210 on Monday at 10 AM. Using schedule A 2002 received through data exchange channel 2100, expense management system 2002 may determine that the user was at staff office meeting 2004. Transaction details 2212 may include details of the transaction, such as items purchased, costs, location, etc. Moreover, expense A 2208 may be associated with a receipt 2214 that is matched to transaction details, for example, using the receipt data tracking and matching through displayable codes discussed herein. However, without selection of an expense category, expense A 2208 may not be assigned to an expense policy and/or category for company A. Instead, by determining that the user was at staff office meeting 2004 through the scheduling application and/or platform integration, expense A 2208 may be assigned to expense category A 2216, such as a category or policy associated with purchases that are made for specifically for staff office meetings and/or work meetings.

Similarly, expense B 2218 includes a time 2220 of Tuesday, 12 PM, transaction details 2222, a receipt 2224, and an expense category B 2226. As shown in schedule A 2002, the user was at lunch appointment 2006 with Alice, a client of the user and organization. Since Alice is a client and based on the scheduling data for schedule A 2002 of the user, expense B 2218 may be assigned to expense category B 2226 to expense the cost of lunch appointment 2006 or client A 2228 (e.g., the organization of Alice or Alice directly). Expense C 2230 is shown with a time 2232 of Wednesday, 1 PM, transaction details 2234, receipt 2236, and expense category C 2238. The user is shown having travel 2008 to city A from 9 AM-6 PM on Wednesday in schedule A 2002. Thus, the user is expensing all costs during this time to expense category C 2238 for travel, and expense C 2230 is assigned to expense category C 2238 due to time 2232 occurring during travel 2008.

Figure 4:
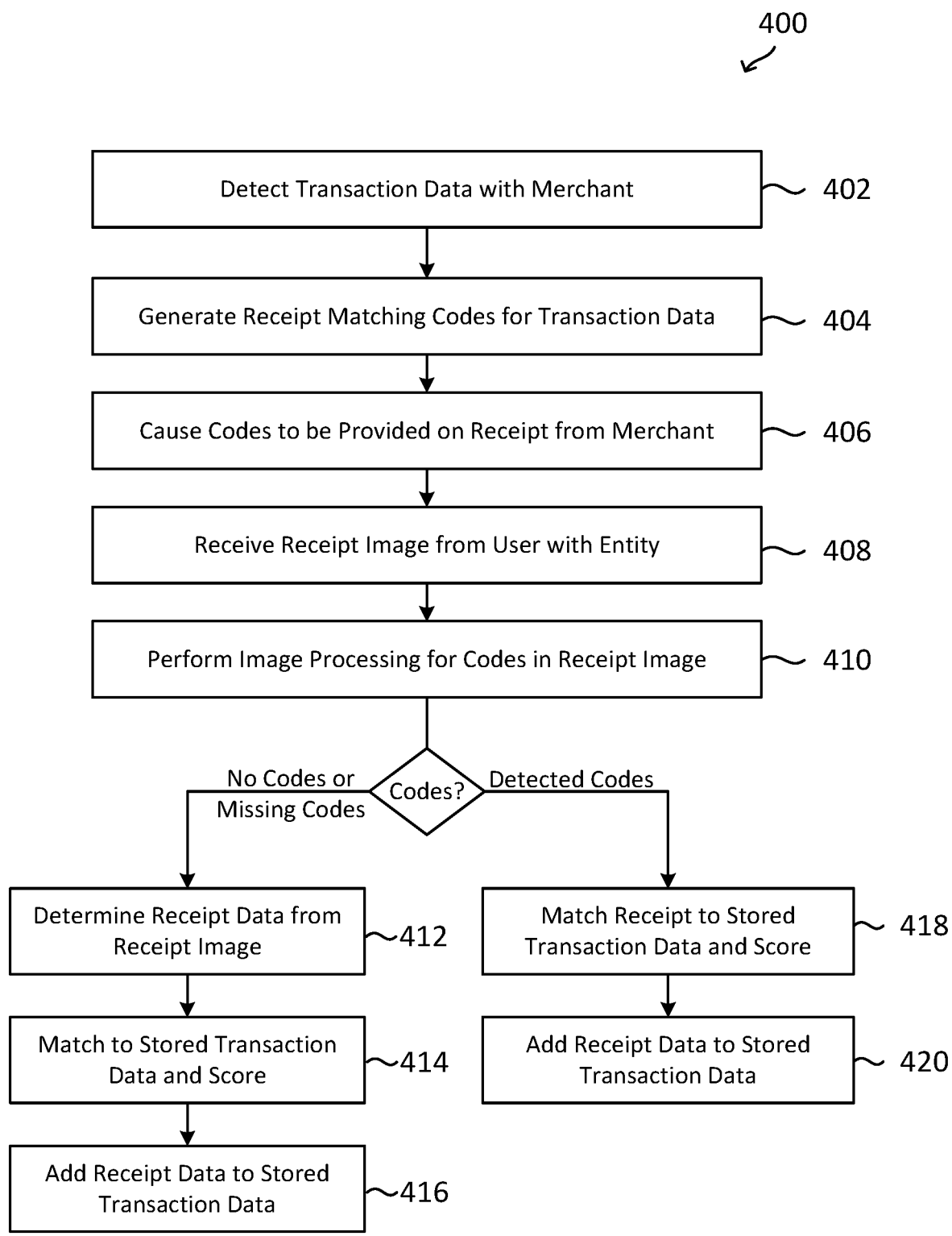
FIG. 4 is an exemplary flowchart for performing receipt code generation and tracking through image processing for receipt data synchronization in an expense management system, according to an embodiment.

FIG. 4 is an exemplary flowchart 400 for performing receipt code generation and tracking through image processing for receipt data synchronization in an expense management system, according to an embodiment. Note that one or more steps, processes, and methods of flowchart 400 described herein may be omitted, performed in a different sequence, or combined as desired or appropriate.

At step 402 of flowchart 400, transaction data with a merchant is detected, such as receiving or detecting a transaction processing request for a transaction on a payment resolution network and using a payment instrument issued to a company that is managed by an expense management system. The transaction data may be stored by the expense management system for resolution under an expense policy and later categorization of the expense for the transaction. Thereafter, the expense management system generates receipt matching codes for the transaction data, which may correspond to at least one alphanumeric, bar, or QR code for the specific transaction data, at step 404. For example, an authorization code and a transaction identifier may be generated. These codes are then caused to be output on a receipt from the merchant, at step 406. The codes may be printed onto a physical receipt or may be added to a digital receipt transmitted to a device of a user requesting transaction processing or of the organization of the user.

At step 408, a receipt image or other digital copy of the receipt is received from the user with the entity or organization that utilizes the expense management system for expense policy enforcement. The receipt may correspond to an image captured using a camera of a device, such as a mobile device, or may correspond to the digital receipt forwarded to the expense management system over a communication channel. The receipt's digital copy may be sent in response to the expense management system requesting the receipt after detecting transaction processing or may be sent by the user at a later point when the user completes expensing the transaction and reporting the transaction to the organization or expense management system. Image processing is then performed on the receipt image to identify the codes on the receipt image or other digital copy, at step 410. For example, the codes may be identified through OCR or other image processing and knowledge of a code length or code content. The codes may also be read from a printed code image, such as a bar or QR code. Certain image segmentation or comparison to receipt fingerprints or models may be used to identify where the codes are placed on the receipt, and then utilize OCR or other image processing to extract the codes. A code fingerprint may be used to determine that codes are printed in line with other data on the receipt or in particular locations of the receipt.

If no codes are extracted from the receipt or the receipt appears to be missing codes, then at step 412, receipt data is determined from the receipt image, such as merchant information and identifiers, transaction data (e.g., items, cost, tax, tip, etc.), and other information that can be extracted from the receipt. The receipt data is matched to stored transaction data with the expense management system, at step 414, which may limit the matching and querying of database information to those transactions processed or managed on behalf of the organization. The receipt data matching to stored transaction data is also scored, at step 414, which may determine a highest or most likely match between the data. Once the most likely match is determined, the receipt data, including the extracted data and/or the receipt image or digital copy, is added to the stored transaction data, at step 416. In one embodiment, the data is stored only if the highest or most likely match exceeds a predetermined threshold.

Conversely, if at step 410, the codes are detected in the image, then the receipt is matched to the stored transaction data using the codes, at step 418. Further, the matching of the codes to the stored transaction data is scored to determine a most likely match between the codes (as well as additional receipt data extracted using image processing). The most likely match between the receipt and the stored transaction data is determined, and at step 420, the receipt data (e.g., the extracted receipt data and the receipt image or digital copy) is added to the stored transaction data. As with the above, the data is stored only if the highest or most likely match exceeds a predetermined threshold, which prevents non-reliable data from being stored and/or used.

Figure 5:
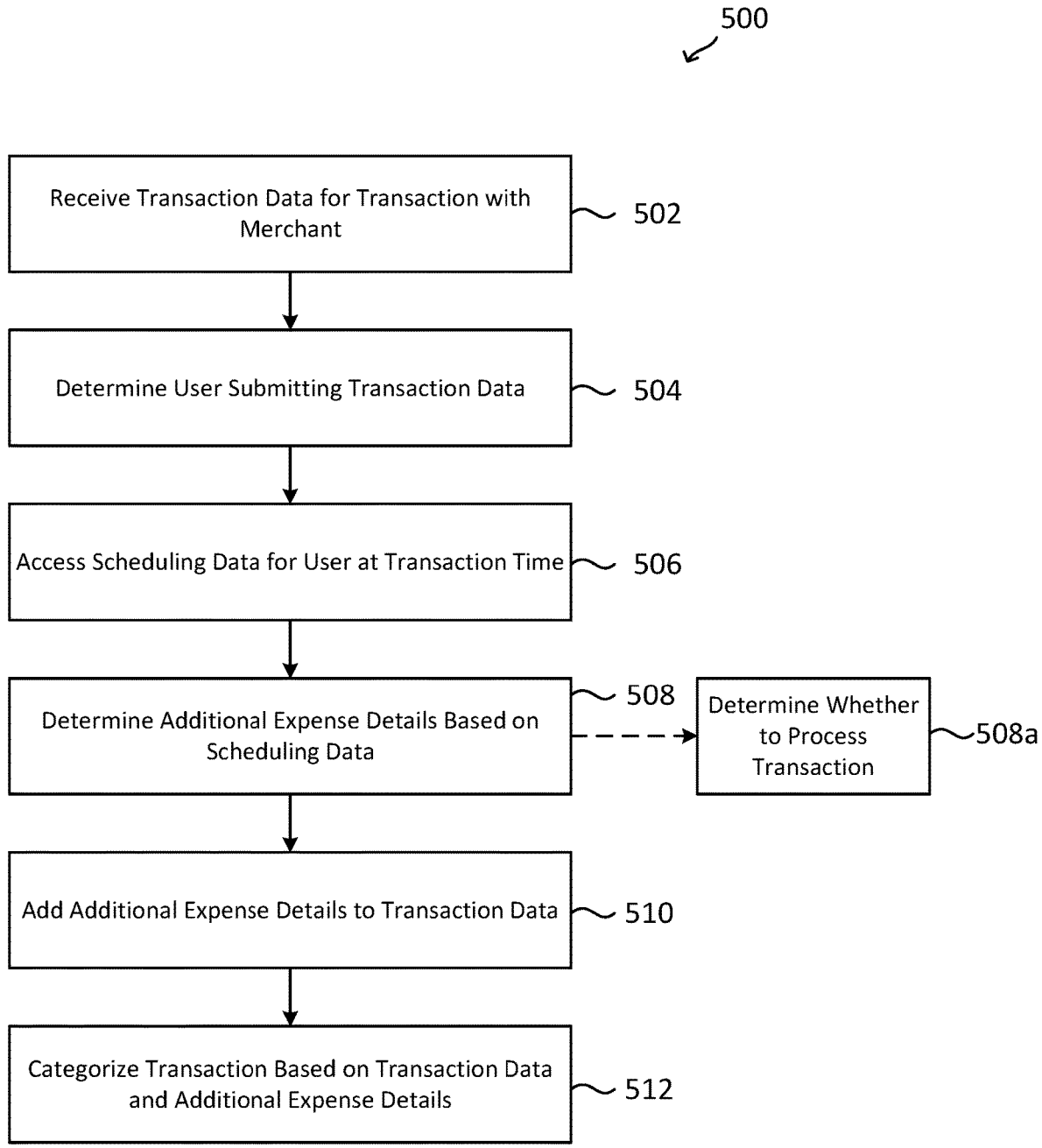
FIG. 5 is an exemplary flowchart for performing application data synchronizations based on application integrations for automatically categorizing expense data, according to an embodiment.

FIG. 5 is an exemplary flowchart for performing application data synchronizations based on application integrations for automatically categorizing expense data, according to an embodiment. Note that one or more steps, processes, and methods of flowchart 500 described herein may be omitted, performed in a different sequence, or combined as desired or appropriate.

At step 502 of flowchart 500, transaction data for a transaction with a merchant is received and/or detected. For example, a transaction processing request for a transaction on a payment resolution network and using a payment instrument issued to a company that is managed by an expense management system may be detected. The transaction data may be stored by the expense management system for categorization of the expense for the transaction using calendar or scheduling information for the user generating the transaction. Thus, at step 504, the user that submitted the transaction is determined. For example, the card identifier used to process the transaction may be linked to a specific user so that the user is identified. The user may also be identified through co-locating a mobile device of the user for the organization to the merchant location using a GPS unit or other location detection component of the mobile device. Other data matching may also be used, such as mobile communications at the time of the transaction or indicating transaction processing.

At step 506, scheduling data for the user at the transaction time is accessed. The scheduling data may be accessed through an application or online platform integration with a scheduling application and process for the user, such as a digital calendar of the user. Additional expense details are then determined based on the scheduling data, at step 508. The additional expense details may be determined based on information and details in the scheduling data at the time, such as a meeting name, client name, user identifiers at the meeting or appointment, travel details, location of the appointment or travel, identification of the appointment content or reason, or other information. For example, the scheduling data may indicate user names, phone numbers, or emails that attended the meeting, a client name for the meeting, or a location of the appointment that may be used to add expense details to the transaction and further categorize the transaction under an expense policy so that the expense may be added to expense limits, client reimbursement, or other expense management. In some embodiments, step 508 may include a sub-step 508a, where the expense management system may further determine whether to process the transaction based on the calendar data. For example, during travel, expenses may be expensed to the organization for reimbursement to the user. However, certain expenses, such as personal gifts for friends or family may not be covered under the expense policy for travel under the user class. Thus, if the calendar information indicates that the user is not currently working or purchasing items for organizational travel, then the expense may be declined for processing or may be categorized as an unauthorized purchase that is the user's responsibility for payment.

At step 510, the additional expense details are added to the transaction data stored by the system based on the transaction processing. The additional expense details may define the transaction under an expense policy by matching the transaction to particular categories for the expense policy. This may allow the expense management system to better define the transaction and automate categorizations of expenses without requiring user input. The transaction is then categorized based on the transaction data and the additional expense details, at step 512, such that the transaction is expensed under a particular expense policy and category.

Thus, using various embodiments discussed herein, companies can better (e.g., more efficiently and more accurately) track and manage expenses incurred by users associated with a company funding source or account by using data contained within a receipt or transaction record to match data within a database for tracking, approving and otherwise managing financial transactions conducted by such users.

Figure 6:
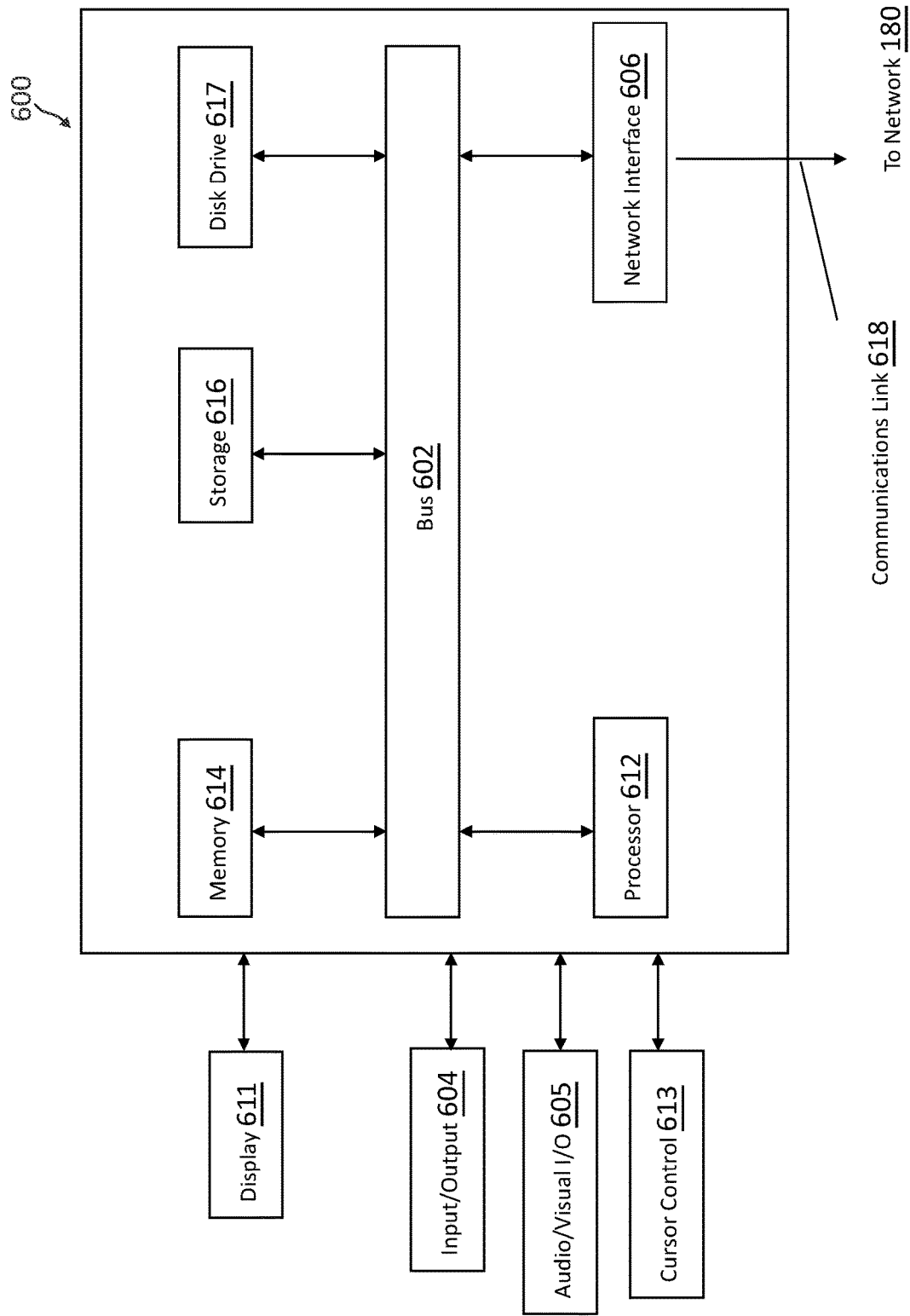
FIG. 6 is a block diagram of a computer system suitable for implementing one or more components in FIG. 1, according to an embodiment.

FIG. 6 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 600 in a manner as follows.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons, image, or links, and/or moving one or more images, etc., and sends a corresponding signal to bus 602. I/O component 604 may also include an output component, such as a display 611 and a cursor control 613 (such as a keyboard, keypad, mouse, etc.). An optional audio input/output component 605 may also be included to allow a user to use voice for inputting information by converting audio signals. Audio I/O component 605 may allow the user to hear audio. A transceiver or network interface 606 transmits and receives signals between computer system 600 and other devices, such as another communication device, service device, or a service provider server via network 180. In one embodiment, the transmission is wireless, although other transmission mediums and methods may also be suitable. One or more processors 612, which can be a micro-controller, digital signal processor (DSP), or other processing component, processes these various signals, such as for display on computer system 600 or transmission to other devices via a communication link 618. Processor(s) 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor(s) 612 and other components by executing one or more sequences of instructions contained in system memory component 614. Logic may be encoded in a computer readable medium, which may refer to any medium that participates in providing instructions to processor(s) 612 for execution. Such a medium may take many forms, including but not limited to, non-volatile media, volatile media, and transmission media. In various embodiments, non-volatile media includes optical or magnetic disks, volatile media includes dynamic memory, such as system memory component 614, and transmission media includes coaxial cables, copper wire, and fiber optics, including wires that comprise bus 602. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
    a non-transitory memory storing instructions; and
    one or more hardware processors coupled to the non-transitory memory and configured to read the instructions from the non-transitory memory to cause the system to perform operations comprising:
        verifying a transaction between a user and a merchant that was received from a merchant device based on a code placed in a portion of a receipt and an image of the receipt captured by a user device of the user, wherein the code was previously placed on the receipt during a processing of the transaction, and wherein the verifying includes validating the code based on a code placement of the code on the receipt;
        determining an application integration by the system with an application on the user device of the user;
        determining, based on comparing activity data retrieved from the application via the application integration with transaction data obtained from the receipt, an activity of the user that was associated with the transaction;
        determining funding source data for the transaction from a payment network used for processing the transaction using a funding source;
        generating additional transaction data for transaction based on the activity and the funding source data; and
        storing the additional transaction data with the receipt for the transaction.

2. The system of claim 1, wherein the validating comprises:
    determining a data placement fingerprint associated with the receipt, wherein the data placement fingerprint designates the code placement for the code on the receipt;
    identifying the portion of receipt in the image that includes the code based on the data placement fingerprint; and
    reading the code from the portion using a text recognition process.

3. The system of claim 2, wherein the data placement fingerprint comprises one of a plurality of data placement fingerprints for different code placements of codes on receipts each based on at least one of a corresponding merchant, a corresponding transaction, or corresponding information printed on the receipt.

4. The system of claim 1, wherein the operations further comprise:
    determining at least one of a merchant identifier for the merchant, a date of the transaction, or an amount of the transaction based on the receipt; and
    assigning the transaction to a category for an expense policy based on the additional transaction data and the at least one of the merchant identifier, the date, or the amount.

5. The system of claim 1, wherein the application comprises a calendar application having calendar information for the user, and the activity comprises one of a meeting, an appointment, or a schedule of the user determined from the calendar information.

6. The system of claim 5, wherein the operations further comprise:
    allocating an expense reimbursement payment for the transaction to a client of the user based on the one of the meeting, the appointment, or the schedule.

7. The system of claim 1, wherein the application comprises one of a messaging application or a location application, and wherein the additional transaction data comprises at least one of another user with the user or a location of the user during the transaction.

8. The system of claim 1, wherein, prior to the verifying, the operations further comprise:
    intercepting data for the transaction on the payment network;
    generating the code that enables tracking of the transaction on the payment network;
    inserting, on the payment network into the intercepted data, the code with the code placement for the code on the receipt; and
    receiving the image of the receipt associated with the processing of the transaction on the payment network.

9. The system of claim 8, wherein the generating the code is based on at least two codes for expense allocation categories and a corresponding one of the expense allocation categories for the transaction, wherein the inserting the code into the data causes a generation of a physical copy of the receipt by the merchant, and wherein the image comprises a digital image capture of the physical copy of the receipt.

10. A method comprising:
    verifying a transaction between a user and a merchant that was received from a merchant device based on a code placed in a portion of a receipt and an image of the receipt captured by a user device of the user, wherein the code was previously placed on the receipt during a processing of the transaction, and wherein the verifying includes validating the code based on a code placement of the code on the receipt;

determining an application integration with an application on the user device of the user;

determining, based on comparing activity data retrieved from the application via the application integration with transaction data obtained from the receipt, an activity of the user that was associated with the transaction;

determining funding source data for the transaction from a payment network used for processing the transaction using a funding source;

generating additional transaction data for transaction based on the activity and the funding source data; and storing the additional transaction data with the receipt for the transaction.

11. The method of claim 10, wherein the validating comprises:

determining a data placement fingerprint associated with the receipt, wherein the data placement fingerprint designates the code placement for the code on the receipt;

identifying the portion of receipt in the image that includes the code based on the data placement fingerprint; and reading the code from the portion using a text recognition process.

12. The method of claim 11, wherein the data placement fingerprint comprises one of a plurality of data placement fingerprints for different code placements of codes on receipts each based on at least one of a corresponding merchant, a corresponding transaction, or corresponding information printed on the receipt.

13. The method of claim 10, further comprising:

determining at least one of a merchant identifier for the merchant, a date of the transaction, or an amount of the transaction based on the receipt; and assigning the transaction to a category for an expense policy based on the additional transaction data and the at least one of the merchant identifier, the date, or the amount.

14. The method of claim 10, wherein the application comprises a calendar application having calendar information for the user, and the activity comprises one of a meeting, an appointment, or a schedule of the user determined from the calendar information.

15. The method of claim 14, further comprising:

allocating an expense reimbursement payment for the transaction to a client of the user based on the one of the meeting, the appointment, or the schedule.

16. The method of claim 10, wherein the application comprises one of a messaging application or a location application, and wherein the additional transaction data comprises at least one of another user with the user or a location of the user during the transaction.

17. The method of claim 10, wherein, prior to the verifying, the method further comprises:

intercepting data for the transaction on the payment network;

generating the code that enables tracking of the transaction on the payment network;

inserting, on the payment network into the intercepted data, the code with the code placement for the code on the receipt; and receiving the image of the receipt associated with the processing of the transaction on the payment network.

18. The method of claim 17, wherein the generating the code is based on at least two codes for expense allocation categories and a corresponding one of the expense allocation categories for the transaction, wherein the inserting the code into the data causes a generation of a physical copy of the receipt by the merchant, and wherein the image comprises a digital image capture of the physical copy of the receipt.

19. A non-transitory machine-readable medium having stored thereon machine-readable instructions executable to cause a machine to perform operations comprising:

verifying a transaction between a user and a merchant that was received from a merchant device based on a code placed in a portion of a receipt and an image of the receipt captured by a user device of the user, wherein the code was previously placed on the receipt during a processing of the transaction, and wherein the verifying includes validating the code based on a code placement of the code on the receipt;

determining an application integration with an application on the user device of the user;

determining, based on comparing activity data retrieved from the application via the application integration with transaction data obtained from the receipt, an activity of the user that was associated with the transaction;

determining funding source data for the transaction from a payment network used for processing the transaction using a funding source;

generating additional transaction data for transaction based on the activity and the funding source data; and storing the additional transaction data with the receipt for the transaction.

20. The non-transitory machine-readable medium of claim 19, wherein the validating comprises:

determining a data placement fingerprint associated with the receipt, wherein the data placement fingerprint designates the code placement for the code on the receipt;

identifying the portion of receipt in the image that includes the code based on the data placement fingerprint; and reading the code from the portion using a text recognition process.

* * * * *